(12) United States Patent
Wang (10) Patent No.: US 11,768,423 B2
(45) Date of Patent: Sep. 26, 2023

(54) IMAGE ACQUISITION APPARATUS, ELECTRONIC DEVICE, IMAGE ACQUISITION METHOD AND STORAGE MEDIUM

(71) Applicant: BEIJING XIAOMI MOBILE SOFTWARE CO., LTD., Beijing (CN)

(72) Inventor: Xuanzhao Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/213,087

(22) Filed: Mar. 25, 2021

(65) Prior Publication Data

US 2022/0026781 A1   Jan. 27, 2022

(30) Foreign Application Priority Data

Jul. 23, 2020  (CN) .......................... 202010719858.9

(51) Int. Cl.
H04N 23/56      (2023.01)
H04N 23/74      (2023.01)
G03B 15/05      (2021.01)

(52) U.S. Cl.
CPC .............. *G03B 15/05* (2013.01); *H04N 23/56* (2023.01); *H04N 23/74* (2023.01)

(58) Field of Classification Search
CPC .............. H04N 5/2256; H04N 5/23218; H04N 5/23219; H04N 5/2354; G03B 15/05
See application file for complete search history.

(56) References Cited

U.S. PATENT DOCUMENTS

| | | | |
|---|---|---|---|
| 2002/0089599 | A1 | 7/2002 | Menning |
| 2016/0088278 | A1 | 3/2016 | Velarde et al. |
| 2017/0206704 | A1* | 7/2017 | Inoue ................. H04N 5/2628 |
| 2019/0394383 | A1* | 12/2019 | Kim ................. H04N 5/232933 |

FOREIGN PATENT DOCUMENTS

| | | |
|---|---|---|
| CN | 110149471 A | 8/2019 |
| CN | 110531564 A | 12/2019 |
| EP | 1098190 A2 | 5/2001 |
| JP | 2002148686 A | 5/2002 |
| JP | 2008058978 A | 3/2008 |

(Continued)

OTHER PUBLICATIONS

European Search Report in the European Application No. 21165560.0, dated Aug. 16, 2021, (9p).

(Continued)

*Primary Examiner* — Daniel M Pasiewicz
(74) *Attorney, Agent, or Firm* — Arch & Lake LLP (57) ABSTRACT

An image acquisition apparatus includes a camera, a flash array adjacent to the camera, and a flash driving circuit connected to the flash array. In the process of image acquisition based on the image acquisition apparatus, a driving signal provided by the flash driving circuit may be used to drive corresponding flashes in the flash array to be lighted, a driving current for controlling each of the flashes may be adjusted to control the brightness of a respective one of the flashes. The number of lighted flashes in the flash array or the light supplement brightness of the lighted flashes may be adjusted adaptively according to different shooting scenes.

7 Claims, 3 Drawing Sheets

---

Acquire a preview image obtained by camera preview — 51

Adjust values a light supplement parameter(s) of the flash array based on a difference between an actual image effect and a desired image effect of the preview image, wherein the light supplement parameter(s) include(s) a number of lighted flashes in the flash array and/or a light supplement brightness of the lighted flashes — 52

(56) References Cited

FOREIGN PATENT DOCUMENTS

| | | |
|---|---|---|
| JP | 2011160083 A | 8/2011 |
| JP | 2013037085 A | 2/2013 |
| JP | 2014137482 A | 7/2014 |
| JP | 2015146006 A | 8/2015 |
| JP | 2018504619 A | 2/2018 |
| JP | 2019146112 A | 8/2019 |
| KR | 20100109195 A | 10/2010 |
| KR | 101083606 B1 | 11/2011 |
| KR | 20120053424 A | 5/2012 |
| WO | 2019104182 A1 | 5/2019 |

OTHER PUBLICATIONS

First Office Action of the Japanese application No. 2021-046852, dated Feb. 15, 2022, (5 pages).
First Office Action of the Korean Application No. 10-2021-0035028, dated Apr. 21, 2022, (10p).

\* cited by examiner

IMAGE ACQUISITION APPARATUS, ELECTRONIC DEVICE, IMAGE ACQUISITION METHOD AND STORAGE MEDIUM

CROSS-REFERENCE TO RELATED APPLICATION

The present application is based on and claims priority of Chinese Patent Application No. 202010719858.9, filed on Jul. 23, 2020, the entire content of which is incorporated herein by reference for all purposes.

TECHNICAL FIELD

The present disclosure relates to the electronic technology, and in particular to an image acquisition apparatus, an electronic device, an image acquisition method, and a storage medium.

BACKGROUND

In the related art, an image acquisition apparatus may be installed in an electronic device to provide a corresponding shooting function for the electronic device. With increase of users' demands of using electronic devices for shooting, more and more manufacturers advertise their electronic devices by taking the shooting function as a key feature. However, in a dark environment, images captured thereby have poor effects due to limited light, which not only lead to poor shooting effects, but also increase the difficulty of post-optimization, and affect the user experiences.

SUMMARY

The present disclosure provides an image acquisition apparatus, an electronic device, an image acquisition method, and a storage medium.

According to a first aspect of the present disclosure, an image acquisition apparatus is provided. The image acquisition apparatus includes: a camera; a flash array, distributed adjacent to the camera, and including a plurality of flashes disposed in a preset array; a flash driving circuit, connected to the flash array and configured to provide a first driving signal for driving the plurality of flashes to be lighted; and a camera driving circuit, connected to the camera and configured to provide a second driving signal for driving acquisition of an image to the camera, wherein the flash driving circuit is independent of the camera driving circuit.

According to a second aspect of the present disclosure, an image acquisition method is provided, and the method includes: acquiring a preview image obtained by camera preview; adjusting values of a light supplement parameter of a flash array based on a difference between an actual image effect and a desired image effect of the preview image, wherein the light supplement parameter includes at least one of: the number of lighted flashes in the flash array, or a light supplement brightness of the lighted flashes.

According to a third aspect of the present disclosure, an electronic device is provided, which includes a processor and a memory configured to store instructions executable by the processor. The processor is configured to: acquire a preview image obtained by camera preview; and adjust values of a light supplement parameter of a flash array based on a difference between an actual image effect and a desired image effect of the preview image, wherein the light supplement parameter comprises at least one of: the number of lighted flashes in the flash array, or a light supplement brightness of the lighted flashes.

BRIEF DESCRIPTION OF THE DRAWINGS

The accompanying drawings herein are incorporated into and form part of the specification, illustrate examples consistent with the disclosure, and serve to explain the principles of the disclosure together with the specification.

DETAILED DESCRIPTION

Examples of the present disclosure will be described in detail herein with drawings. In the following description, when the drawings are referred to, unless otherwise indicated, the same numbers in the drawings represent the same or similar elements. The examples described below do not represent all examples consistent with the present disclosure. Instead, they are only examples of devices and methods consistent with some aspects of the present disclosure as detailed in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
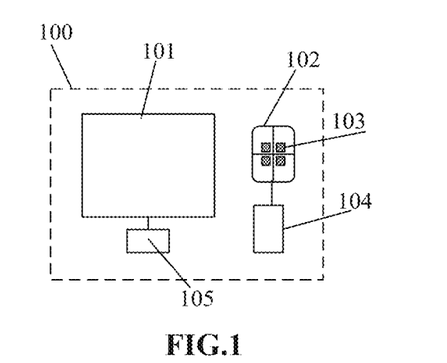
FIG. 1 is a schematic diagram of a structure of an image acquisition apparatus according to an example of the present disclosure.

FIG. 1 is a schematic diagram of a structure of an image acquisition apparatus according to an example of the present disclosure. As shown in FIG. 1, the image acquisition apparatus 100 includes:
- a camera 101;
- a flash array 102, distributed adjacent to the camera, and the flash array 102 includes a plurality of flashes arranged in a preset array;
- a flash driving circuit 104, connected to the flash array and configured to provide a first driving signal for driving one or more of the plurality of flashes to be lighted; and
- a camera driving circuit 105, connected to the camera 101 and configured to provide a second driving signal for driving acquisition of an image to the camera 101,
- wherein the flash driving circuit 104 is independent of the camera driving circuit 105.

Here, the camera refers to a component having an image acquisition function. In the example of the present disclosure, a flash array may be arranged adjacent to the camera, so that when image acquisition is performed based on the camera, light supplementing for the object to be acquired in the acquisition region may be performed based on the light emitted by the flash array. The image acquisition of the camera and the light irradiation of the flashes included in the flash array may be at a same plane, and the region irradiated by the light emitted by the flash array corresponds to the image acquisition region of the camera.

During implementation, a first driving signal for driving the flash(es) to be lighted may be provided by the flash driving circuit arranged in the image acquisition apparatus, and the first driving signal is sent to the flash array, thereby lighting at least some of the flashes in the flash array. After the first driving signal reaches the flash array, the corresponding flash(es) in the flash array is/are lighted. Here, the first driving signal may be a current signal or a voltage signal provided by the flash driving circuit. Taking the first driving signal being a current signal provided by the flash driving circuit as an example, in the example of the present disclosure, the light supplement brightness of each flash may be adjusted by adjusting the size of the driving current provided by the flash driving circuit to the respective flash.

In one example of the present disclosure, the flash array is arranged adjacent to the camera, which enables the region irradiated by the flashes in the flash array to correspond to the acquisition region of the camera, so that light supplement for the acquisition region of the camera can be performed based on the light emitted by the flashes in the flash array.

For example, some of the flashes in the flash array may be arranged on the left side of the camera, and the other ones of the flashes may be arranged on the right side of the camera, so that the light supplement range can be increased. In some examples, all of the flashes in the flash array may be arranged on the right side of the camera; alternatively, all the flashes in the flash array may be arranged on the left side of the camera, or the like, as long as the flash array and the camera are distributed adjacent to each other, which is not limited herein. In the example of the present disclosure, the flashes may be arranged in a preset array, and the flashes are distributed on at least one side of the image acquisition apparatus, so that the region irradiated by the light emitted by the flash array can correspond to the image acquisition region of the camera.

In one example of the present disclosure, the image acquisition apparatus is composed of a camera, a flash array distributed adjacent to the camera, and a flash driving circuit connected to the flash array. During image acquisition based on the image acquisition apparatus, a driving signal provided by the flash driving circuit can be used to drive a corresponding flash(es) in the flash array to be lighted, or brightness of each flash may be adjusted by controlling a driving current for the respective flash. In this way, the number of lighted flashes in the flash array and/or the light supplement brightness of the lighted flashes may be adjusted according to different shooting scenes, so that different light effects can be generated, and compared with the light supplement for an image to be captured based on only one light effect, the quality of the captured image is improved, thereby improving the user experiences.

In addition, in one example of the present disclosure, a second driving signal for driving acquisition of an image can be provided to the camera through the camera driving circuit, and the camera driving circuit and the flash driving circuit are provided independently of each other, so that the image acquisition function of the camera and the light supplement function of the flashes can be implemented through two different driving circuits respectively.

In one example of the present disclosure, since a flash array independent of a camera is provided, and independent adjustment of a light supplement parameter(s) of each flash in the flash array is needed, the entire process is relatively complicated, and cannot be implemented by a circuit controlling on and off of only one or two flashes as in the related art. In the example of the present disclosure, by providing a flash driving circuit independent of the camera driving circuit, control of the flashes in the flash array can be implemented with less modification to the original circuit. Additionally, since the camera driving circuit and the flash driving circuit are independent of each other, the image acquisition and light supplement functions can be implemented asynchronously, and the flexibility of image acquisition can be improved.

In some examples, the flash array is a rectangular array distributed on one side of the camera.

Here, the rectangular array includes a plurality of flashes, for example, at least three flashes. For example, the number of flashes included in a rectangular array may be 4.

Optionally, the flash array is a rectangular array distributed on one side of the camera. Optionally, the plurality of flashes are arranged in a circular array surrounding the camera. Optionally, the plurality of flashes are spaced apart at an equal interval.

Figure 2:
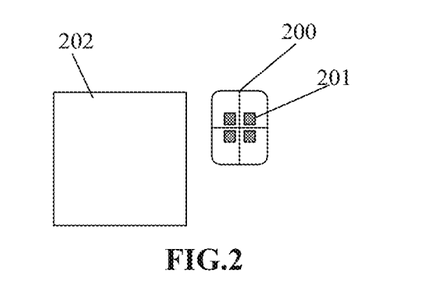
FIG. 2 is a schematic diagram of a flash array according to an example of the present disclosure.

FIG. 2 is a schematic diagram of a flash array according to an example of the present disclosure. As shown in FIG. 2, the flash array 200 includes four flashes 201 arranged in a rectangular array and located on the right side of the camera 202. In some examples, the rectangular array may be located on the left side of the camera, which is not limited herein.

Compared with the related art in which only one or two flashes are provided, in the example of the present disclosure, a plurality of flashes are provided, the plurality of flashes form a rectangular array, the rectangular array is distributed on one side of the camera, and the light supplement parameter(s) of each flash in the rectangular array may be adjusted to achieve adjustability of the light supplement effect of the region irradiated by the flash array.

In some examples, the plurality of flashes are arranged surrounding the camera in a circular array.

Figure 3:
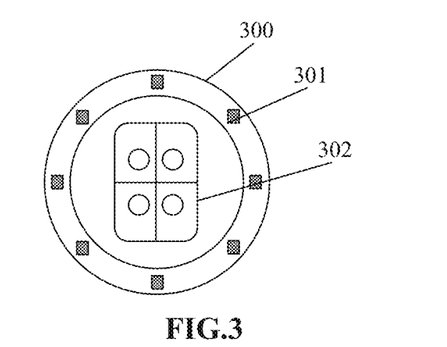
FIG. 3 is a schematic diagram of another flash array according to an example of the present disclosure.

In examples of the present disclosure, the larger the size of the camera, the greater the number of flashes included in the circular array. For another example, the number of flashes included in the circular array may be 4, 6, 8, or the like. FIG. 3 is a schematic diagram of another flash array according to an example of the present disclosure. As shown in FIG. 3, the flash array 300 includes eight flashes 301 that surround the periphery of the camera 302 in a circular array. Compared with arranging the flash array on one side of the camera, in the example of the present disclosure, a plurality of flashes are arranged surrounding the periphery of the camera 302 in a circular array, and therefore the light distribution of the region irradiated by the flash array is more uniform.

In some examples, the plurality of flashes are spaced apart at an equal interval. In the example of the present disclosure, by arranging the plurality of flashes to be spaced apart at an equal interval, the region range irradiated by the light emitted by the flash array is widened, and thereby the light supplement range is increased. In some examples, the flashes include light emitting diodes (LEDs). In some examples, the flashes may be distributed continuously, such that the light emitted by the flash array can be made more uniform.

In some examples, the electronic device includes the image acquisition apparatus described in any of the above examples.

In an example of the present disclosure, an image acquisition apparatus may be disposed in an electronic device, wherein the electronic device may include a mobile terminal and a stationary terminal. The mobile terminal may include a mobile phone, a notebook computer, a tablet computer, a wearable electronic device, or the like, and the stationary terminal may include a personal computer device, a monitoring device, a medical device, or the like.

Figure 4:
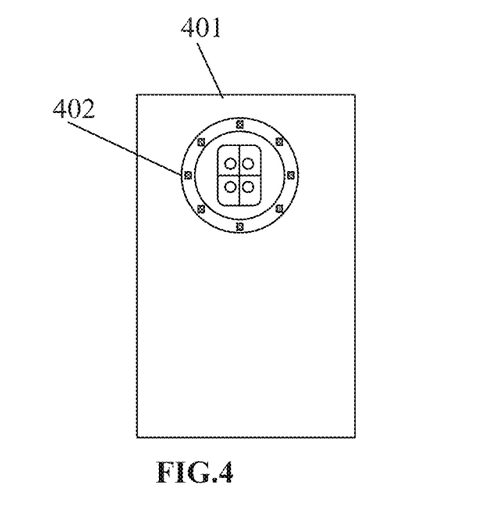
FIG. 4 is a schematic diagram of an electronic device according to an example of the present disclosure.

FIG. 4 is a schematic diagram of an electronic device according to an example of the present disclosure. As shown in FIG. 4, the electronic device 401 includes an image acquisition apparatus 402. In some examples, the image acquisition apparatus may be located on a side of the electronic device as same as that of the display apparatus, or on a side of the electronic device opposite to that of the display apparatus. For example, when the electronic device is a mobile phone, the image acquisition apparatus may be a front camera apparatus located on the same side as the display screen of the mobile phone, or a rear camera apparatus located opposite to the display screen of the mobile phone.

With respect to the apparatus in the above-described examples, the specific manner in which the apparatuses perform operations has been described in detail in an example of the method, and will not be described in detail herein.

Figure 5:
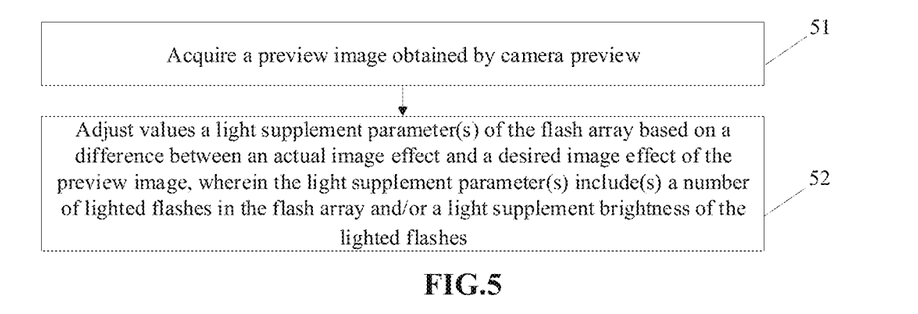
FIG. 5 is a flowchart of an image acquisition method according to an example of the present disclosure.

FIG. 5 is a flowchart of an image acquisition method according to an example of the present disclosure. As shown in FIG. 5, the method is applied to the electronic device provided in the foregoing example, and mainly includes the following steps.

In step 51, a preview image obtained by camera preview is acquired.

In step 52, a light supplement parameter(s) of the flash array is(are) adjusted based on a difference between an actual image effect and a desired image effect of the preview image, wherein the light supplement parameter(s) include(s) a number of lighted flashes in the flash array and/or a light supplement brightness of the lighted flashes.

In some examples, the camera of the electronic device may be started in response to an input instruction of an application having an image acquisition function. Here, the electronic device may respond to the input instruction of the application having the image acquisition function. Various applications may be installed in the electronic device for inputting instructions for triggering respective functions of the electronic device. Here, an application having an image acquisition function is installed in the electronic device, a camera for acquiring an image is provided in the electronic device, and therefore, a user may start the camera in the electronic device through the input instruction of the application having the image acquisition function. The application may be an application program such as an application program, a WebApp or a browser, as long as the input interface of the application program is provided and the corresponding instruction is input, and the camera may be a camera mounted in the electronic device or another component having a function of capturing an image.

In the example of the present disclosure, in a process in which the electronic device continuously outputs the image acquired by the camera, that is, in an image preview process, the preview image obtained by the camera preview may be acquired, after the preview image is acquired, the actual image effect of the preview image may be determined, and the number of lighted flashes in the flash array and/or the light supplement brightness of the lighted flashes may be adjusted based on the difference between the actual image effect and the preset desired image effect.

Here, the actual image effect includes, but is not limited to, the actual brightness parameter value of the preview image, and the desired image effect may include, but is not limited to, a preset desired brightness parameter value. For example, after the preview image is acquired; for each region of the preview image, an actual brightness parameter value may be determined, then a difference value between the actual brightness parameter value and a desired brightness parameter value may be determined, and the number of lighted flashes in the flash array and/or the light supplement brightness of the lighted flashes may be adjusted based on the difference value between the actual brightness parameter value and the desired brightness parameter value.

In some examples, a user may input a user instruction based on an application program installed in the electronic device, to determine the desired image effect according to the user instruction.

For example, adjustment controls corresponding to different light supplement parameters may be displayed on the application interface of the application program, where different light supplement parameters have different light effects.

In some examples, the light supplement parameters further include a light supplement color for each flash, so that a light effect of different colors can be achieved by adjusting the colors of the lights emitted by the respective flashes. In the example of the present disclosure, the light effect is adjusted through an adjustment instruction input by the user. For example, in the case of a relatively dark environment, the light supplement brightness of the flash array may be increased based on the received adjustment instruction. In this way, the user can select a light effect according to the actual situation, thereby improving the flexibility of light control and further improving user experiences.

In the example of the present disclosure, the actual image effect of the preview image can be determined in the process of previewing the image, and the light supplement parameter of the flash array may be adjusted based on the difference between the actual image effect and the expected image effect. In this way, the image acquisition is performed after the object to be acquired is supplemented with light by using the flashes with the adjusted light supplement parameter values, so that the acquired image can reach the desired image effect, thus improving the experiences of the user using the electronic device while improving the quality of the acquired image.

In some examples, the adjusting light supplement parameter(s) of the flash array includes:

adjusting the light supplement brightness of at least some of the flashes in the flash array.

Here, when there is one or more lighted flashes in the flash array, the light supplement brightness of some of the lighted flashes may be adjusted, or the light supplement brightness of all the lighted flashes may be adjusted.

In some examples, when the electronic device is in a dark environment, the actual brightness parameter value of each region of the acquired preview image may be small. In this case, in order to achieve the desired effect of the acquired image, all or part of the flashes in the flash array may be lighted to improve the brightness of the region irradiated by the flash array.

In some examples, after all or part of the flashes are lighted, the preview image may be continued to be acquired, and it is determined whether the brightness parameter value of the acquired preview image reaches the desired brightness parameter value. If the brightness parameter value of the acquired preview image has not reached the desired brightness parameter value, the brightness of the lighted flashes in the flash array may be increased, so that the brightness of the region irradiated by the flash array can be increased. Since the region irradiated by the flash array corresponds to the acquisition region of the camera, in the example of the present disclosure, the brightness of the region irradiated by the flash array may be increased, so that the image acquired for the acquisition region reaches the desired image effect.

In the example of the present disclosure, each of the flashes in the flash array can be controlled individually by a driving signal provided by a flash driving circuit so as to implement individual control of a single flash. For example, the brightness of some of the flashes in the flash array can be increased, the brightness of some of the flashes in the flash array can be maintained, and the brightness of some of the flashes in the flash array can be reduced. In this way, a region that needs light supplement can be supplemented with light, and a region that does not need light supplement is not supplemented or the light supplement brightness of the region that does not need light supplement is reduced. Compared with uniformly adjusting all the flashes at the same time, the example may reduce the possibility of local over-exposure or local under-exposure of the acquired image.

In some examples, the adjusting light supplement parameter(s) of the flash array based on the difference between the actual image effect and the desired image effect of the preview image includes:

determining a region to be supplemented with light from the preview image based on multiple difference values, each difference value being a difference value between an actual image effect and a desired image effect of a respective one of regions in the preview image;

determining, according to a preset mapping relationship between the regions in the preview image and the flashes, a flash(es) corresponding to the region to be supplemented with light; and adjusting the light supplement parameter of the flash(es) corresponding to the light supplement region.

For each region of the preview image, different actual image effects may be presented in different environments, and the difference values between the actual image effect and the desired image effect may be different in different environments. During implementation, the difference value between the actual image effect of each region of the preview image and the desired image effect of the region may be determined first to determine the region to be supplemented with light from the preview image. For example, a region having a lower brightness parameter value in the preview image is determined as a region to be supplemented with light, and a region having a higher actual brightness parameter value is a region not needing light supplement. During implementation, the values of the light supplement parameter(s) of the flash(es) corresponding to the region to be supplemented with light may be adjusted, and the values of the light supplement parameter(s) of the flash(es) corresponding to the region not needing light supplement can be maintained unchanged.

In some examples, a preset mapping relationship between regions in the preview image and the flashes in the flash array may be preset. Thus, in the process of previewing the image, the flash(es) corresponding to each region of the preview image can be determined according to the preset mapping relationship. In the implementation process, after the region to be supplemented with light is determined, the flash(es) corresponding to the region to be supplemented with light may be determined according to the preset mapping relationship, and the values of the light supplement parameter(s) of the flash(es) corresponding to the region to be supplemented with light may be adjusted.

Optionally, the adjusting the values of the light supplement parameter of the flash array based on the difference between the actual image effect and the desired image effect of the preview image includes: determining a region to be supplemented with light from the preview image based on a difference between an actual image effect and a desired image effect of each of regions of the preview image; determining, according to a preset mapping relationship between the regions in the preview image and the respective flashes, one or more flashes corresponding to the region to be supplemented with light; and adjusting the values of the light supplement parameter of the one or more flashes corresponding to the region to be supplemented with light.

Optionally, the determining the region to be supplemented with light from the preview image based on the difference between the actual image effect and the desired image effect of each of regions of the preview image includes: for each of the areas of the preview image, determining whether an actual brightness parameter value of a respective one of the regions of the preview image is less than a desired brightness parameter value of the respective region of the preview image; and determining a region in which the actual brightness parameter value is less than the desired brightness parameter value as the region to be supplemented with light.

Optionally, the adjusting the values of the light supplement parameter of the flash corresponding to the region to be supplemented with light includes at least one of the following: increasing a number of lighted flashes corresponding to the region to be supplemented with light; or increasing the light supplement brightness of the lighted flashes corresponding to the region to be supplemented with light.

Optionally, the method further includes: detecting a shooting instruction after adjustment of the values of the light supplement parameter of the flash array;

upon detection of the shooting instruction, acquiring an image in an acquisition region corresponding to a region irradiated by the flash array after the adjustment of the values of the light supplement parameter, to obtain the acquired image.

Figure 6:
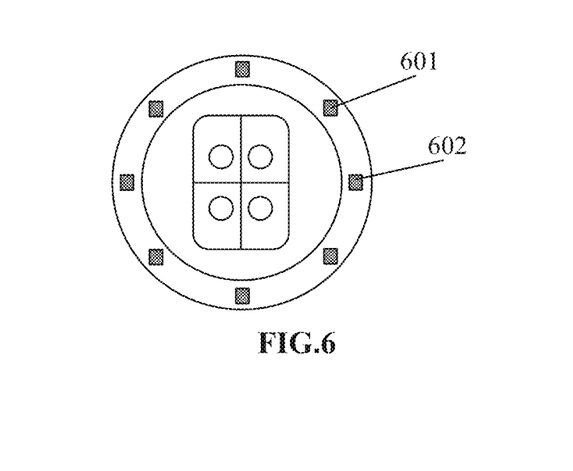
FIG. 6 is a schematic diagram of a structure of a flash according to an example of the present disclosure.

FIG. 6 is a schematic diagram of a structure of a flash according to an example of the present disclosure. As shown in FIG. 6, if flashes corresponding to a region to be supplemented with light are a first flash 601 and a second flash 602, and if the first flash 601 and the second flash 602 have been lighted during implementation, the driving currents of the first flash 601 and the second flash 602 may be adjusted based on the flash driving circuit, to increase the light supplement brightness of the first flash 601 and the second flash 602. If the first flash 601 and the second flash 602 are not lighted, the first flash 601 and the second flash 602 may be lighted based on a driving signal of the flash driving circuit, to supplement light for the object to be acquired based on light emitted by the first flash 601 and the second flash 602.

In the example of the present disclosure, the flash(es) corresponding to the region to be supplemented with light may be determined based on a preset mapping relationship between regions in the preview image and the respective flashes, and the light supplement parameter(s) of the flash(es) corresponding to the region to be supplemented with light may be adjusted in a targeted manner, so that the image can be presented with a hierarchical feeling and the finally acquired image has a better quality compared with that acquired with the values of the light supplement parameter(s) of all flashes adjusted to be the same.

In some examples, the operation of determining a region to be supplemented with light from the preview image based on multiple difference values, each being a difference value between an actual image effect and a desired image effect of a respective one of regions in the preview image includes: for each region of the preview image, determining whether an actual brightness parameter value is smaller than a desired brightness parameter value, and determining a region in which the actual brightness parameter value is less than the desired brightness parameter value as the region to be supplemented with light.

For each region of the preview image, different actual image effects may be presented in different environments, and the difference values between the actual image effect and the desired image effect may be different in different environments. During implementation, the difference value between the actual image effect of each region of the preview image and the desired image effect of the region may be determined first to determine the region to be supplemented with light from the preview image. For example, a region having a lower brightness parameter value in the preview image is determined as a region to be supplemented with light, and a region having a higher actual brightness parameter value is a region not supplemented with light. During implementation, values of the light supplement parameter(s) of the flash(es) corresponding to the region to be supplemented with light may be adjusted, and values of the light supplement parameter(s) of the flash(es) corresponding to the region not needing light supplement can be maintained unchanged. In this way, power consumption can be reduced while performing light supplement.

In some examples, the adjusting values of the light supplement parameter (s) of the flash(es) corresponding to the region to be supplemented with light includes: increasing a number of lighted flashes corresponding to the region to be supplemented with light, and/or increasing the light supplement brightness of the lighted flashes corresponding to the region to be supplemented with light.

Since the more the number of lighted flashes, the higher the brightness of the irradiated region, in the example of the present disclosure, light supplement for the object to be acquired may be performed by increasing the number of lighted flashes corresponding to the region to be supplemented with light. In some examples, when all the flashes corresponding to the region to be supplemented with light are lighted, if the actual brightness parameter value of the preview image has not reached the desired brightness parameter value, the brightness of the flashes corresponding to the region to be supplemented with light may be increased in addition to lighting all the flashes corresponding to the region to be supplemented with light. In some examples, in the case that some of the flashes corresponding to the region to be supplemented with light are lighted, if the actual brightness parameter value of the preview image does not reach the desired brightness parameter value, the brightness of the lighted flashes may be increased, or the number of lighted flashes corresponding to the region to be supplemented with light may be increased, to enable the actual brightness parameter value of the preview image to reach the desired brightness parameter value.

In some examples, the method further includes:
detecting a shooting instruction after adjustment of the values of the light supplement parameter(s) of the flash array; and
upon detection of the shooting instruction, acquiring an image in an acquisition region corresponding to a region irradiated by the flash array after the adjustment of the values of the light supplement parameter(s), to obtain the acquired image.

Figure 7:
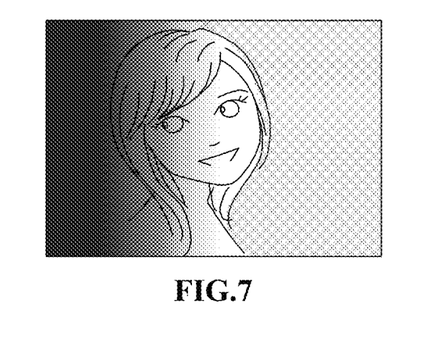
FIG. 7 is a schematic view of a human face image after light supplement according to an example of the present disclosure.

In some examples, after a rectangular flash array is formed, an independent flash driving circuit may be arranged for the flash rectangular array, so that light supplement brightness at different angles and of different effects can be implemented by adjusting the driving current of the flash driving circuit, thereby implementing a light supplement effect at a photo studio level. With the face recognition function of the camera, such as the artificial intelligence camera (AI camera) preview function, the angle of the object to be acquired, such as an angle of a human face, can be recognized. If the object to be acquired is a human face, the brightness of the flash array at the angle of the face facing towards the camera can be increased, and the brightness of the flash array at the angle of the face facing away from the camera can be reduced, thereby forming a shadow effect. As shown in FIG. 7, FIG. 7 is a schematic diagram of a human face image after light supplement according to an example of the present disclosure.

Figure 8:
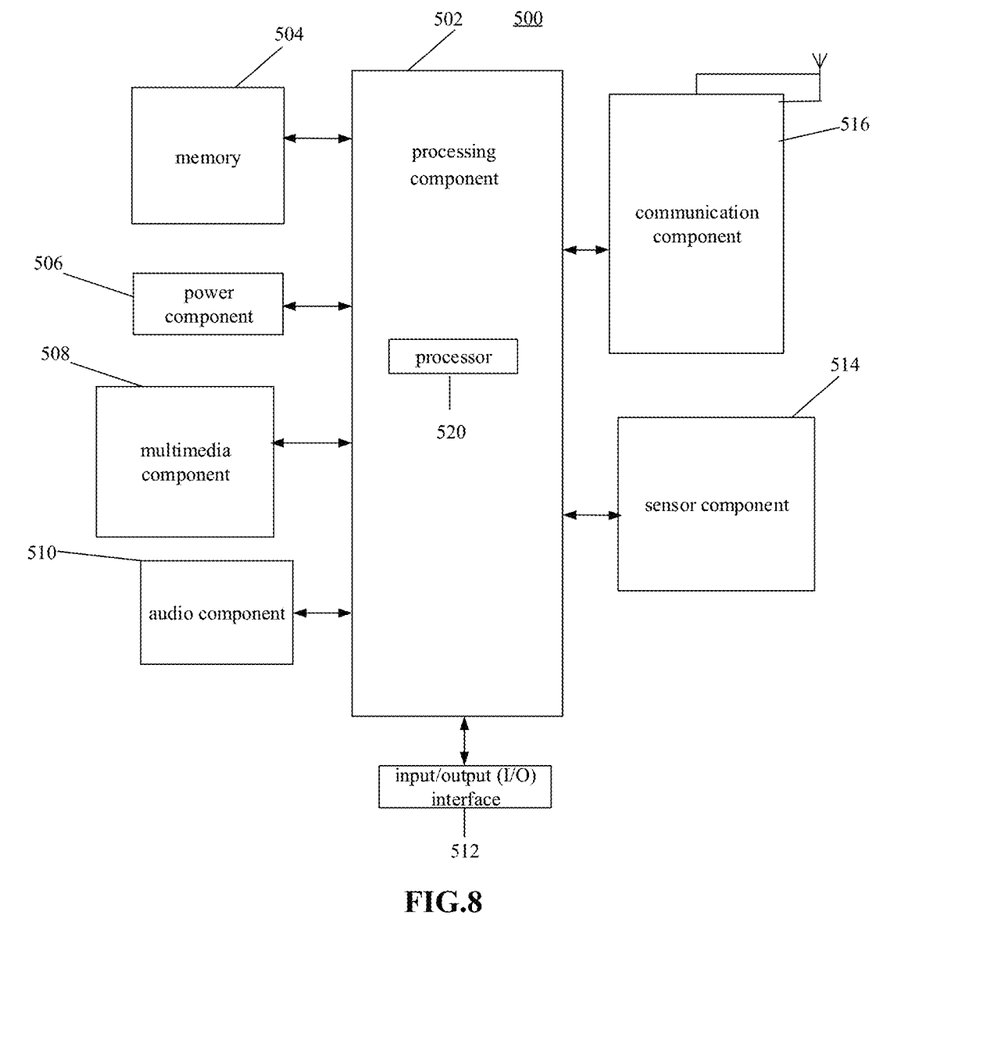
FIG. 8 is a block diagram of a hardware structure of an electronic device according to an example of the present disclosure.

FIG. 8 is a block diagram of a hardware structure of an electronic device according to an example of the present disclosure. For example, the device 500 may be a mobile phone, a computer, a digital broadcast terminal, a messaging device, a game console, a tablet device, a medical device, a fitness device, a personal digital assistant, or the like.

Referring to FIG. 8, the device 500 may include one or more hardware components including: a processing component 502, a memory 504, a power component 506, a multimedia component 508, an audio component 510, an input/output (I/O) interface 512, a sensor component 514, and a communication component 516.

The processing component 502 generally controls the overall operation of the device 500, such as operations associated with display, telephone calls, data communications, camera operations, and recording operations. The processing component 502 may include one or more processors 520 to execute instructions to complete all or part of the steps of the method described above. Further, the processing component 502 may include one or more modules to facilitate interaction between the processing component 502 and other components. For example, the processing component 502 may include a multimedia module to facilitate interaction between the multimedia component 508 and the processing component 502.

The memory 504 is configured to store various types of data to support operations of the device 500. Examples of these data include instructions for any application or method operating on device 500, contact data, phonebook data, messages, pictures, videos, and the like. The memory 504 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 506 supplies power for various components of the device 500. The power component 506 may include a power management system, one or more power sources, and other components associated with generating, managing, and distributing power for the device 500.

The multimedia component 508 includes a screen providing an output interface between the device 500 and the user. In some examples, the screen may include a liquid crystal display (LCD) and a touch panel (TP). If the screen includes a touch panel, the screen may be implemented as a touch screen to receive an input signal from the user. The touch panel includes one or more touch sensors to sense touch, slide, and gestures on the touch panel. The touch sensor may not only sense the boundary of the touch or slide action, but also detect the duration and pressure associated with the touch or slide action. In some examples, the multimedia component 508 includes a front camera and/or a rear camera. When the device 500 is in an operating mode, such as a shooting mode or a video mode, the front camera and/or the rear camera may receive external multimedia data. Each of the front and rear cameras may be a fixed optical lens system or have a focal length and an optical zoom capability.

Audio component 510 is configured to output and/or input audio signals. For example, the audio component 510 includes a microphone configured to receive an external audio signal when the device 500 is in an operating mode, such as a calling mode, a recording mode, and a speech recognition mode. The received audio signal may be further stored in memory 504 or sent via communication component 516. In some examples, the audio component 510 further includes a speaker for outputting an audio signal.

The I/O interface 512 provides an interface between the processing component 502 and the peripheral interface module. The peripheral interface module may be a keyboard, a click wheel, a button, or the like. These buttons may include, but are not limited to, a home button, a volume button, a start button, and a lock button.

The sensor component 514 includes one or more sensors for providing a status assessment of various aspects of the device 500. For example, the sensor component 514 may detect an open/closed state of the device 500, relative positioning of the component, such as a display and a keypad of the device 500, the sensor component 514 may further detect a change in position of the device 500 or one of the components of the device 500, the presence or absence of user contact with the device 500, the orientation or acceleration/deceleration of the device 500, and a change in temperature of the device 500. The sensor component 514 may include a proximity sensor configured to detect the presence of a nearby object without any physical contact. The sensor component 514 may also include a light sensor, such as a CMOS or a CCD image sensor, for use in imaging applications. In some examples, the sensor component 514 may further include an acceleration sensor, a gyroscope sensor, a magnetic sensor, a pressure sensor, or a temperature sensor.

The communication component 516 is configured to facilitate wired or wireless communication between the device 500 and other devices. The device 500 may access a wireless network based on a communication standard, such as WI-FI, 2G, or 6G, or a combination thereof. In one example, the communication component 516 receives a broadcast signal or broadcast-related information from an external broadcast management system via a broadcast channel. In one example, the communication component 516 further includes a near field communication (NFC) module to facilitate short-range communication. For example, the NFC module may be implemented based on the radio frequency identification (RFID) technology, the infrared data association (IrDA) technology, the ultra wideband (UWB) technology, the Bluetooth (BT) technology, and/or other technologies.

In an example of the present disclosure, the device 500 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the methods described above.

In an example of the present disclosure, there is further provided a non-transitory computer-readable storage medium including instructions, such as a memory 504 including instructions, which may be executed by the processor 520 of the device 500 to execute the method described above. For example, the non-transitory computer-readable storage medium may be a ROM, random access memory (RAM), a CD-ROM, a magnetic tape, a floppy disk, an optical data storage device, and the like.

A non-transitory computer readable storage medium including instructions, which, when executed by a processor of an electronic device, enables the electronic device to perform an image acquisition method, the method may include:

acquiring a preview image obtained by camera preview;

adjusting values of a light supplement parameter of the flash array based on a difference between an actual image effect and a desired image effect of the preview image, wherein the light supplement parameter comprises at least one of a number of lighted flashes in the flash array or a light supplement brightness of the lighted flashes.

Other examples of the present disclosure will be readily contemplated by those skilled in the art after considering the specification and practicing the invention disclosed herein. The present disclosure is intended to encompass any variations, uses, or adaptations of the present disclosure that follow the general principles of the present disclosure and include well-known common sense or customary technical means in the art that are not disclosed in the present disclosure. The specification and examples are considered exemplary only, and the true scope and spirit of the present disclosure are indicated by the following claims.

It should be understood that the present disclosure is not limited to the precise structure already described above and shown in the accompanying drawings, and various modifications and changes may be made without departing from scope of the present disclosure. The scope of the present disclosure is limited only by the appended claims.

The invention claimed is:

1. A method for image acquisition, comprising:

acquiring, by a terminal device, a preview image of an object to be acquired obtained by camera preview from a camera;

determining, by the terminal device, a region to be supplemented with light from the preview image based on multiple difference values, each being a difference value between an actual image effect and a desired image effect of a respective one of regions of the preview image;

determining, by the terminal device, according to a preset mapping relationship between the regions of the preview image and flashes from a flash array distributed adjacent to the camera and arranged in the terminal device together with the camera, one or more flashes corresponding to the region to be supplemented with light; and adjusting, by the terminal device, through increasing brightness of the flash array at a first angle of the object to be acquired facing towards the camera and reducing brightness of the flash array at a second angle of the object to be acquired facing away from the camera, values of a light supplement parameter of the one or more flashes corresponding to the region to be supplemented with light, wherein the light supplement parameter comprises at least one of following parameters: a number of lighted flashes in the flash array, or a light supplement brightness of the lighted flashes;

detecting, by the terminal device, a shooting instruction after adjustment of the values of the light supplement parameter of the flash array; and upon detection of the shooting instruction, acquiring, by the terminal device, an image in an acquisition region corresponding to a region irradiated by the flash array after the adjustment of the values of the light supplement parameter.

2. The method of claim 1, wherein determining the region to be supplemented with light from the preview image based on multiple difference values further comprises:

for each of the regions of the preview image, determining whether an actual brightness parameter value of one region is less than a desired brightness parameter value of the region; and determining a region in which the actual brightness parameter value is less than the desired brightness parameter value as the region to be supplemented with light.

3. The method of claim 2, wherein adjusting the values of the light supplement parameter of the one or more flashes corresponding to the region to be supplemented with light comprises at least one of the following:

increasing a number of lighted flashes corresponding to the region to be supplemented with light; or increasing the light supplement brightness of the lighted flashes corresponding to the region to be supplemented with light.

4. A terminal device comprising:

a processor; and a memory configured to store instructions executable by the processor;

wherein the processor is configured to:

acquire a preview image of an object to be acquired obtained by camera preview from a camera;

determine a region to be supplemented with light from the preview image based on multiple difference values, each being a difference value between an actual image effect and a desired image effect of a respective one of regions of the preview image;

determine, according to a preset mapping relationship between the regions of the preview image and flashes from a flash array distributed adjacent to the camera and arranged in the terminal device together with the camera, one or more flashes corresponding to the region to be supplemented with light; and adjust, through increasing brightness of the flash array at a first angle of the object to be acquired facing towards the camera and reducing brightness of the flash array at a second angle of the object to be acquired facing away from the camera, values of a light supplement parameter of the one or more flashes corresponding to the region to be supplemented with light, wherein the light supplement parameter comprises at least one of: a number of lighted flashes in the flash array, or a light supplement brightness of the lighted flashes;

detect a shooting instruction after adjustment of the values of the light supplement parameter of the flash array; and upon detection of the shooting instruction, acquire an image in an acquisition region corresponding to a region irradiated by the flash array after the adjustment of the values of the light supplement parameter.

5. The terminal device of claim 4, wherein in determining the region to be supplemented with light from the preview image based on multiple difference values, the processor is configured to:

for each of the regions of the preview image, determine whether an actual brightness parameter value of one region is less than a desired brightness parameter value of the region;

determine a region in which the actual brightness parameter value is less than the desired brightness parameter value as the region to be supplemented with light.

6. The terminal device of claim 5, wherein in adjusting the values of the light supplement parameter of the one or more flashes corresponding to the region to be supplemented with light, the processor is configured to perform at least one of the following:
   increasing a number of lighted flashes corresponding to the region to be supplemented with light; or
   increasing the light supplement brightness of the lighted flashes corresponding to the region to be supplemented with light.

7. A non-transitory computer readable storage medium, including instructions, which, when executed by a processor of a terminal device, enables the terminal device to perform steps of the image acquisition method of claim 1.

* * * * *